United States Patent
Post et al.

(10) Patent No.: US 10,257,054 B2
(45) Date of Patent: *Apr. 9, 2019

(54) SEARCHABLE BEST FIT ABSTRACTION FRAMEWORK FOR CATALOG DRIVEN SERVICE DELIVERY

(71) Applicant: CenturyLink Intellectual Property LLC, Denver, CO (US)

(72) Inventors: Matthew J. Post, Farmerville, LA (US); Michael K. Bugenhagen, Leawood, KS (US)

(73) Assignee: CenturyLink Intellectual Property LLC, Broomfield, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/857,590

(22) Filed: Dec. 28, 2017

(65) Prior Publication Data
US 2018/0123914 A1 May 3, 2018

Related U.S. Application Data

(63) Continuation of application No. 14/947,445, filed on Nov. 20, 2015, now Pat. No. 9,866,449.

(60) Provisional application No. 62/083,037, filed on Nov. 21, 2014.

(51) Int. Cl.
*H04L 12/24* (2006.01)
*G06Q 30/06* (2012.01)

(52) U.S. Cl.
CPC ..... *H04L 41/5048* (2013.01); *G06Q 30/0603* (2013.01); *H04L 41/5045* (2013.01); *H04L 41/5058* (2013.01)

(58) Field of Classification Search
CPC ............ H04L 41/5048; H04L 41/5058; H04L 41/5045; G06Q 30/0603
See application file for complete search history.

(56) References Cited

U.S. PATENT DOCUMENTS

| | | | |
|---|---|---|---|
| 9,866,449 B2 | 1/2018 | Post et al. | |
| 2002/0098832 A1 | 7/2002 | Fleischer et al. | |
| 2008/0040427 A1* | 2/2008 | Shroff | G06Q 10/10 709/204 |
| 2008/0208897 A1 | 8/2008 | Lew et al. | |
| 2012/0173693 A1* | 7/2012 | Zhang | H04L 41/5041 709/223 |

(Continued)

*Primary Examiner* — Min Jung
(74) *Attorney, Agent, or Firm* — Adsero IP

(57) ABSTRACT

A system for a searchable best fit abstraction framework includes a network having one or more network resources, a network inventory server programmed to generate a network inventory of the one or more network resources, and a searchable best fit abstraction engine in communication with the network inventory server. The searchable best fit abstraction engine includes at least one processor, and non-transitory computer readable media having encoded thereon computer software comprising a set of instructions executable by the at least one processor. The set of instructions includes instructions to retrieve the network inventory, instantiate an inventory class object for at least one network resource, define a set of service abstractions for the inventory class object, provide customer and service provider facing interfaces, and provision at least one service offering satisfying a customer service requirement, or as defined by a service template.

20 Claims, 10 Drawing Sheets

(56) References Cited

U.S. PATENT DOCUMENTS

| | | |
|---|---|---|
| 2012/0191716 A1 | 7/2012 | Omoigui |
| 2013/0151674 A1 | 6/2013 | Weeks |
| 2014/0214914 A1* | 7/2014 | Alex ................ G06F 9/5033 709/201 |
| 2014/0280830 A1* | 9/2014 | Ang ................ H04W 24/00 709/223 |
| 2014/0282037 A1 | 9/2014 | Narasimhan et al. |
| 2015/0195172 A1* | 7/2015 | Abuelsaad .......... H04L 41/0883 709/224 |
| 2015/0289167 A1* | 10/2015 | Alex ................ H04W 28/24 370/329 |
| 2015/0341230 A1 | 11/2015 | Dave et al. |
| 2016/0019636 A1 | 1/2016 | Adapalli et al. |
| 2016/0062746 A1* | 3/2016 | Chiosi .............. G06F 8/35 717/104 |
| 2016/0149770 A1 | 5/2016 | Post et al. |
| 2017/0041203 A1 | 2/2017 | Huuhtanen et al. |
| 2017/0373948 A1* | 12/2017 | Littlejohn .......... H04L 41/5058 |

* cited by examiner

SEARCHABLE BEST FIT ABSTRACTION FRAMEWORK FOR CATALOG DRIVEN SERVICE DELIVERY

CROSS-REFERENCES TO RELATED APPLICATIONS

This application is a continuation of U.S. patent application Ser. No. 14/947,445, filed on Nov. 20, 2015 by Matthew J. Post et al. entitled, "Searchable Best Fit Abstraction Framework for Catalog Driven Service Delivery," which claims priority to U.S. Provisional Patent Application Ser. No. 62/083,037, filed on Nov. 21, 2014 by Matthew J. Post and Michael K. Bugenhagen, entitled, "Searchable Best Fit Abstraction Framework for Telecom Product Catalogs," the disclosures of which are incorporated herein by reference, in its entirety, and for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to searchable catalog-based delivery of network services and products, and more particularly to a framework for the generation and management of a searchable catalog-driven system for service and product delivery across multiple carrier and technology platforms.

BACKGROUND

As new video, data, and telecommunications products and services are increasingly offered and bundled, with ever more options and permutations, cataloging systems have emerged for both customers looking for the products and services and service providers offering the products and services. In a conventional catalog system, the customer may search for a service provider's respective lineup of products and services through a customer facing interface of the service provider's respective catalog system.

Typically a customer may search through a service provider's offerings by individual products and services, or through bundled product and service offerings. Alternatively, a customer may browse the service provider's offerings by specifying a service requirement for functionality, performance, or price. On a service provider facing side of the catalog system, the service provider's catalog system may provide a way to track the availability of new and existing network resources associated with a respective product or service offering.

Thus, conventional cataloging systems offer a way for customers and service providers alike to browse and track a service provider's product and service offerings, the capabilities provided by the product and services, and the network resources provided by the service provider.

However, many product and service offerings increasingly rely on multiple carriers and other service providers for the delivery of the products and services to a customer. In such environments, because the catalog system is limited to a specific service provider's service and product offerings, it is unable to provide any information on an alternative service provider's service and product offerings, or other possible combinations of products and services.

Similarly, for service providers, the catalog system only uses the service provider's inventory of network resources, limiting the service provider's ability to access other network resources from other service providers that the service provider's products and services may utilize or be bundled with. Moreover, each technology platform within a service provider's own technology stack may utilize proprietary conventions to address the same need. Thus, conventional systems are limited in ability to design and search for products and services across multiple elements and using different technology platforms. Thus, a system for providing searchable best fit abstractions is provided by the embodiments below.

BRIEF SUMMARY

According to a set of embodiments, a system, apparatus, and method for implementing a searchable best fit abstraction framework are provided.

The tools provided by various embodiments include, without limitation, methods, systems, and/or software products. Merely by way of example, a method might comprise one or more procedures, any or all of which are executed by a computer system. Correspondingly, an embodiment might provide a computer system configured with instructions to perform one or more procedures in accordance with methods provided by various other embodiments. Similarly, a computer program might comprise a set of instructions that are executable by a computer system (and/or a processor therein) to perform such operations. In many cases, such software programs are encoded on physical, tangible, and/or non-transitory computer readable media (such as, to name but a few examples, optical media, magnetic media, and/or the like).

In an aspect, a system for implementing a searchable best fit abstraction framework for catalog driven service delivery may include a network having one or more network resources in communication with each other, a network inventory server programmed to generate a network inventory of the one or more network resources on the network, and a searchable best fit abstraction engine in communication with the network inventory server. The searchable best fit abstraction engine may further include at least one processor, and non-transitory computer readable media having encoded thereon computer software comprising a set of instructions executable by the at least one processor to retrieve, from the network inventory server, the network inventory of the one or more network resources. An inventory class object may be instantiated for at least one network resource of the one or more network resources, wherein the inventory class object includes a set of service abstractions. The set of service abstractions may be defined to include at least one of properties, interfaces, capabilities, and requirements. A customer facing interface allowing a customer to identify service offerings available to the customer satisfying an at least one service requirement, and a service provider facing interface allowing a provider to define a service offering based on a service template, may be provided. The searchable best fit abstraction engine may then provision at least one service offering satisfying the service requirement or defined by the service template.

In one set of embodiments the searchable best fit abstraction engine may further include in the set of instructions, instructions to receive a search query indicating at least one service requirement, instructions to map each of the at least one service requirement to a set of one or more requirement abstraction. The searchable best fit abstraction engine may identify one or more one inventory class objects, from a pool of inventory class objects, each of the one or more inventory class objects having a respective set of service abstractions satisfying the set of one or more requirement abstractions. One or more matching network resources for each of the one or more inventory class objects and fitting each respective set of service abstractions may further be identified. Based on the one or more matching network resources of the at least one inventory class object, at least one service offering utilizing the one or more matching network resources, satisfying the at least one service requirement may then be identified. A selection of at least one selected service offering of the identified at least one service offering from the customer may be received, wherein the at least one selected service offering is provisioned to a customer premises of the customer.

In further embodiments, the searchable best fit abstraction engine further includes in the set of instructions to identify a service template comprising one or more interconnected inventory class objects, the one or more interconnected inventory class objects including the identified one or more inventory class objects. One or more service offerings, including the at least one service offering fitting the service template may be identified. In another embodiment, the service template may further include a component sub-template defining a prerequisite service. The searchable best fit abstraction engine may further include instructions to identify a prerequisite service offering indicated by the component sub-template, the prerequisite service offering being required to provision the at least one selected service offering. The prerequisite service offering for any of the at least one selected service offering may then be provisioned. In an additional embodiment, at least one of the respective sets of service abstractions may include a requirement for a required inventory class object not included in the service template. The searchable best fit abstraction engine may further include instructions to identify one or more required network resources corresponding to the required inventory class object, the one or more required network resources excluded from the identified one or more network resources; and instructions to identify at least one required service offering utilizing the one or more required network resources. In yet another set of embodiments, the searchable best fit abstraction engine may further include instructions to identify at least a first service template and a second service template, wherein each of the first and second service templates respectively include one or more interconnected inventory class objects, and wherein the first service template includes a first part of the identified one or more inventory class objects, and the second service template includes a second part of the identified one or more inventory class objects; and instructions to identify one or more service offerings for each of the first and second service templates, the one or more service offerings including the at least one service offering.

According to another set of embodiments, the searchable best fit abstraction engine further includes instructions to receive a service template having one or more interconnected inventory class objects, from a service provider, each of the one or more interconnected inventory class objects having a respective set of service abstractions; instructions to determine whether at least one network resource is available in the inventory of network resources satisfying the respective set of service abstractions for each of the one or more interconnected inventory class objects; and instructions to create the at least one service offering utilizing one or more network resources of the inventory of network resources determined to satisfy each respective set of service abstractions. In further embodiments, the searchable best fit abstraction engine may further include instructions to identify an at least one external network resource available from a second service provider different from the service provider, satisfying the respective set of service abstractions for at least one of the one or more interconnected inventory class objects, wherein the at least one service offering utilizes the at least one external network resource. In some additional embodiments, the one or more network resources may include one or more host machines respectively hosting one or more virtualized machine instances. The searchable best fit abstraction engine may further include instructions to instantiated an inventory class object for each of the one or more virtualized machine instances.

In another aspect, a searchable best fit abstraction engine is provided having at least one processor and non-transitory computer readable media having encoded thereon computer software comprising a set of instructions. The set of instructions may be executable by the at least one processor to retrieve, from a network inventory server, a network inventory of network resources; instantiate an inventory class object for at least one network resource in the network inventory, wherein the inventory class object includes a set of service abstractions; define the set of service abstractions, wherein the set of service abstractions includes at least one of properties, interfaces, capabilities, and requirements; provide a customer facing interface allowing a customer to identify service offerings available to the customer satisfying an at least one service requirement; provide a service provider facing interface allowing a provider to define a service offering based on a service template; and provision at least one service offering satisfying the service requirement or defined by the service template.

According to various embodiments, the set of instructions may further include instructions to receive a search query indicating at least one service requirement; instructions to map each of the at least one service requirement to a set of one or more requirement abstraction; instructions to identify at least one inventory class object comprising a set of service abstractions satisfying the set of one or more requirement abstractions; instructions to identify one or more network resources belonging to the identified at least one inventory class object; instructions to identify based on the one or more network resources of the at least one inventory class object, at least one service offering utilizing the one or more network resources, satisfying the at least one service requirement, and available to the customer; and instructions to receive, via the customer facing interface, a selection of at least one selected service offering of the identified at least one service offering from the customer, wherein the at least one selected service offering is provisioned to a customer premises of the customer. In further embodiments, the set of instructions may further include instructions to identify a service template comprising one or more interconnected inventory class objects, the one or more interconnected inventory class objects including the identified at least one inventory class object; and identify one or more service offerings, including the at least one service offering, utilizing the service template. In some further embodiments, the service template may further include a component sub-template defining a prerequisite service. The set of instructions may thus further include instructions to identify a prerequisite service offering indicated by the component sub-template, the prerequisite service offering being required to provision the at least one selected service offering; and instructions to provision the prerequisite service offering for any of the at least one selected service offering.

According to another set of embodiments, the set of instructions may further include instructions to receive a service template comprising one or more interconnected inventory class objects, from a service provider, each of the one or more interconnected inventory class objects having a respective set of service abstractions; instructions to determine whether at least one network resource is available in the inventory of network resources satisfying the respective set of service abstractions for each of the one or more interconnected inventory class objects; and instructions to create at least one service offering utilizing one or more network resources of the inventory of network resources determined to satisfy each respective set of service abstractions. In further embodiments, the set of instructions may further include instructions to identify an at least one external network resource available from a second service provider different from the service provider, satisfying the respective set of service abstractions for at least one of the one or more interconnected inventory class objects, wherein the at least one service offering utilizes the at least one external network resource.

In another aspect, a method of implementing a searchable best fit abstraction framework may include retrieving, from a network inventory server, a network inventory of network resources; instantiating, via a searchable best fit abstraction engine, an inventory class object for at least one network resource in the network inventory, wherein the inventory class object includes a set of service abstractions; defining, via the searchable best fit abstraction engine, the set of service abstractions, wherein the set of service abstractions includes at least one of properties, interfaces, capabilities, and requirements; providing, via the searchable best fit abstraction engine, a customer facing interface allowing a customer to identify service offerings available to the customer satisfying an at least one service requirement; providing, via the searchable best fit abstraction engine, a service provider facing interface allowing a provider to define a service offering based on a service template; and provisioning, via the searchable best fit abstraction engine, at least one service offering satisfying the service requirement or defined by the service template.

In one set of embodiments, the method may further include receiving, via the customer facing interface, a search query indicating at least one service requirement; mapping, via the searchable best fit abstraction engine, each of the at least one service requirement to a set of one or more requirement abstraction; identifying, via the searchable best fit abstraction engine, at least one inventory class object comprising a set of service abstractions satisfying the set of one or more requirement abstractions; identifying, via the searchable best fit abstraction engine, one or more network resources belonging to the identified at least one inventory class object; identifying, via the searchable best fit abstraction engine, based on the one or more network resources of the at least one inventory class object, at least one service offering utilizing the one or more network resources, satisfying the at least one service requirement, and available to the customer; and receiving, via the searchable best fit abstraction engine, a selection of at least one selected service offering of the identified at least one service offering from the customer, wherein the at least one selected service offering is provisioned to a customer premises of the customer. In further embodiments, the method may include identifying, via the searchable best fit abstraction engine, a service template comprising one or more interconnected inventory class objects, the one or more interconnected inventory class objects including the identified at least one inventory class object; and identifying, via the searchable best fit abstraction engine, one or more service offerings, including the at least one service offering, utilizing the service template.

In another set of embodiments, the method may further include receiving, via the searchable best fit abstraction engine, a service template comprising one or more interconnected inventory class objects, from a service provider, each of the one or more interconnected inventory class objects having a respective set of service abstractions; determining, via the searchable best fit abstraction engine, whether at least one network resource is available in the inventory of network resources satisfying the respective set of service abstractions for each of the one or more interconnected inventory class objects; and creating, at the searchable best fit abstraction engine, at least one service offering utilizing one or more network resources of the inventory of network resources determined to satisfy each respective set of service abstractions. In further embodiments, the method may also include identifying, via the searchable best fit abstraction engine, an at least one external network resource available from a second service provider different from the service provider, satisfying the respective set of service abstractions for at least one of the one or more interconnected inventory class objects, wherein the at least one service offering utilizes the at least one external network resource.

Various modifications and additions can be made to the embodiments discussed without departing from the scope of the invention. For example, while the embodiments described above refer to particular features, the scope of this invention also includes embodiments having different combination of features and embodiments that do not include all of the above described features.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF CERTAIN EMBODIMENTS

While various aspects and features of certain embodiments have been summarized above, the following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers herein used to express quantities, dimensions, and so forth, should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Figure 1:
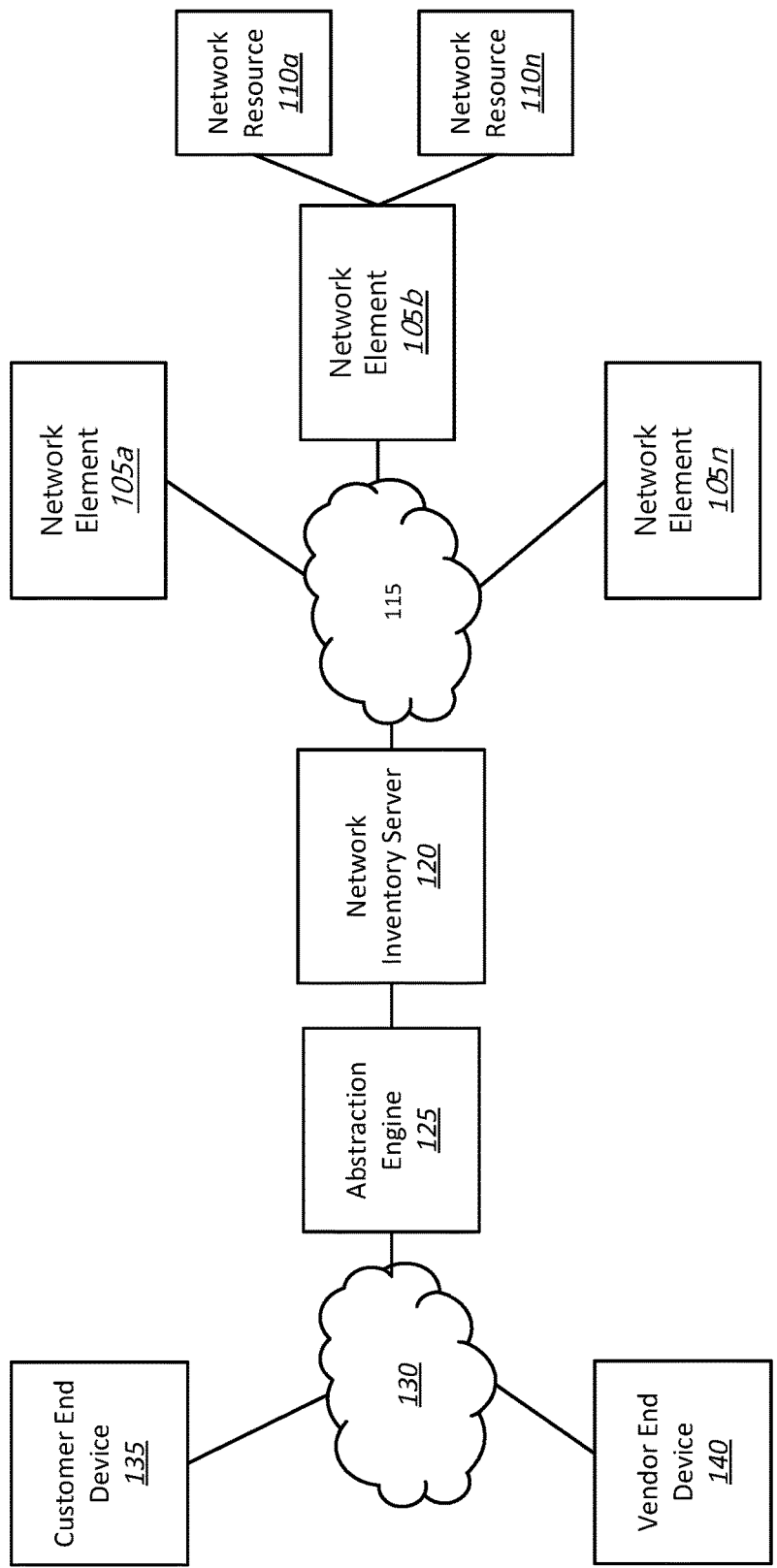
FIG. 1 is a schematic block diagram of a system for implementing a searchable best fit abstraction framework, in accordance with various embodiments.

FIG. 1 illustrates a system 100 for implementing a searchable best fit abstraction framework, in accordance with various embodiments. The system 100 includes network elements 105a, 105b through 105n (collectively 105), network resources 110a through 110n (collectively 110), communications network 115, network inventory server 120, abstraction engine 125, communications network 130, customer end device 135, and vendor end device 140. According to various embodiments, network elements 105a through 105n (where "n" represents the total number of network elements in a sequence 1-n), may be communicatively coupled to a network inventory server 120 via communications network 115. Each network element 105 may further be communicatively coupled to one or more network resources 110a-110n. Network elements 105 may include any network devices for provisioning network based technologies and services, between any of communication service providers, local exchange carriers such as backbone service providers, and a customer's premises. Thus, network elements 105 may include, without limitation, servers, routers, switches, border gateways, residential gateways, internet exchange points, broadband remote access servers (BRAS), network interface devices (NID), optical network terminal (ONT), digital subscriber line access multiplexers (DLSAM), cable modem termination system (CMTS), optical line termination (OLT), customer end devices, set-top boxes (STB), or any other elements that may communicate with a service provider's network. Network resources 110 may include, without limitation, network elements 105 themselves, hardware and software resources available from network devices or over various communications networks like the internet, network relationships between different nodes, communication media utilized between network elements, and any other resource that may be accessible over a communications network 115, 130. In some sets of embodiments, the network elements 105 and/or network resources 110n may belong to the same or separate networks, operated by one or more different vendors or service providers. For example, network elements 105a may belong to a network operated by a first service provider, while network element 105b and corresponding network resources 110a, 110n may belong to a second service provider. In other embodiments, the network elements 105 and network resources 110 may all belong to a single service provider.

In various embodiments, the network inventory server 120 may be in communication with each of the network elements 105 and network resources 110 accessible over communications network 115. In some embodiments, the network inventory server 120 may be in communication with network elements 105 and network resources 110 over multiple communications networks 115. The communications network 115, 130 may include, without limitation, both wired and wireless networks; a local area network (LAN), including without limitation a fiber network, or an Ethernet network; a wide-area network (WAN); a wireless wide area network (WWAN); a virtual network, such as a virtual private network (VPN); the Internet; an intranet; an extranet; a public switched telephone network (PSTN); an infra-red network; a wireless network, including without limitation a network operating under any of the IEEE 802.11 suite of protocols, the Bluetooth protocol, various cellular data standards including worldwide interoperability for microwave access (WiMAX) and long term evolution (LTE), or any other wireless protocol; or any combination of these or other networks.

Accordingly, the network inventory server 120 may be a server computer programmed to generate a network inventory of all the network elements 105 and network resources 110 that are accessible over each of the one or more networks 115 to which the network inventory server 120 is connected. In various embodiments, a network inventory may provide an accounting of all available network resources 105, 110 on a given network 115. In some embodiments, the network inventory server 120 may individually poll each network element 105 and other network resources 110. In other embodiments, the network elements 105 and network resources 110 may register with the network inventory server 120. As will be appreciated by those having skill in the art, the manner in which the network inventory is generated should not be limited to the techniques above, and any other suitable techniques, or combinations of techniques, may be utilized by the network inventory server 120.

The network inventory server 120 may in turn be communicatively coupled to an abstraction engine 125. In various embodiments, the abstraction engine may include hardware, software, or a combination of hardware and software, capable of implementing and executing a searchable best-fit abstraction framework for catalog driven service delivery, as will be discussed in further detail below. Accordingly, the abstraction engine 125 may include, without limitation, a server computer, such as an application server, web server, catalog server or the like; or a user's end device, such as a personal computer, workstation, tablet computer, mobile device, or the like. In a further set of embodiments, the abstraction engine 125 may be included in the network inventory server 120, or the network inventory server 120 may be implemented as part of the abstraction engine 125. In another set of embodiments, the abstraction engine 125, network inventory server 120, or both, may be implemented as part of a system on a chip (SoC), application specific integrated circuit (ASIC), field programmable gate array (FPGA), or other similarly programmable embedded system. Correspondingly, the abstraction engine 125 may include various computer architecture, including, but not limited to, a microprocessor, system storage, system memory, and other non-transitory computer readable media. The non-transitory computer readable media may in turn be encoded with software instructions allowing the abstraction engine 125 to implement the searchable best fit abstraction framework, as will be discussed in more detail with respect to FIG. 10 below.

According to various sets of embodiments, the abstraction engine 125 may be configured to retrieve the network inventory from the network inventory 120. The abstraction engine 125 may then abstract, for each of the various network elements 105 and network resources 110 in the network inventory, and instantiate an inventory class object. Thus, inventory class objects may be created for the one or more network elements 105 and network resources 110, grouping the one or more network elements 105 and network resources into groups and classifications. In one set of embodiments, the inventory class objects may be created based on, without limitation, properties, interfaces, capabilities, and requirements abstracted from the one or more network elements 105 and network resources 110. In various embodiments, the service abstractions may be derived from a common pool of abstractions that may be shared across various technology platforms, and by various vendors, service providers, and carrier. For example, the properties of a network element 105 or network resource 110 may specify, without limitation: attributes and characteristics of a device such as assigned identifiers; internet protocol (IP) and network addresses; hardware addresses such as a media access control (MAC) address; serial numbers; model numbers; manufacturer or vendor identification; physical location information indicating a geographic location of a respective network element 105 or network resource 110; and cost and pricing information. The interfaces of a network element 105 or network resource 110 may specify, without limitation: either of hardware interfaces, software interfaces, or both, utilized and accepted by the network elements 105 and network resources 110; communication media utilized by the network elements 105 or network resources 110, such as wired and wireless communication media, including, but not limited to, twisted twisted pair cabling—including Cat 5, Cat 5e, Cat 6, other Ethernet cables, and telephone cables, and optical fiber, Wi-Fi, Bluetooth, infrared (IR), radio frequency (RF), and cellular communications, or combination of the above communication media. The capabilities of a network element 105 or network resource 110 may specify, without limitation: both atomic capabilities and composite capabilities comprising two or more atomic capabilities or other composite capabilities; hardware performance specifications, such as memory performance specifications, CPU performance specifications, storage size and performance specifications, and network and interface performance specifications; a class of performance, service level agreement (SLA), quality of service (QoS), such as performance and reliability guarantees; network functionality, features, and specifications, such as network bandwidth, security, speed, monitoring functionality, and the like; operations, administration, and management (OAM) functionality; and any other information related to functions and capabilities provided by the network elements 105 and network resources 110. The requirements of a network element 105 or network resource 110 may specify requirements needed by the network element 105 or network resource 110 to function and provide the capabilities. The requirements may include, without limitation: an indication of a required inventory class object; an identification of a required network element 105 or network resource 110; interface requirements such as communications protocols; required performance specifications, such as bandwidth; a required property, such as location requirements; required QoS; required costs; required inputs or control signals; compatibility requirements between specific devices, manufacturers, or the like; required security authorizations; or any other service abstraction that may be required. Accordingly, network elements 105 and network resources 110 sharing a common set of service abstractions may share and belong to the same inventory class objects. In some embodiments, once an inventory class object has been instantiated, the inventory class object may further be added to a common pool of inventory class objects. In other sets of embodiments, the inventory class objects may already exist. Thus, the abstraction engine 125 may determine which inventory class object applies to each of the one or more network elements 105 and network resources 110. In one set of set of embodiments, various inventory class objects may include, without limitation, service point class objects, logical connectivity class objects, BRAS functional object, gateway functional objects, user-network interface (UNI) class objects, Ethernet virtual connection (EVC) objects, among others corresponding to known and common types of network elements 105 and network resources 110, across multiple technology and service provider platforms. In additional embodiments, the one or more network resources may include one or more host machines that may each respectively host one or more virtualized machine (VM) instances. Thus, the abstraction engine may further instantiated a VM class object for each of the one or more VM instances.

According to various sets of embodiments, the abstraction engine 125 may further provide both a customer facing interface and a service provider interface. In one set of embodiments, the customer facing interface may be accessible, by customer end device 135, through communications network 130. The customer facing interface may allow a customer to identify service offerings that are available to the customer, which satisfy an at least one service requirement as specified by the customer. The abstraction engine 125 may then receive a search query from the customer indicating the at least one service requirement. The abstraction engine 125 may abstract, from each service requirement, a set of one or more requirement abstractions needed to provide the service requirement. For example, in one set of embodiments, the search query may specify that "real-time Ethernet access" is required. Thus, the abstraction engine may map the service requirement for real-time Ethernet access to a set of requirement abstractions needed to provision real-time Ethernet access to the customer. In another example, the customer may further specify, in the search query, a service requirement for multi-class of service capability on Ethernet access. The search query may specify, as a service requirement, two defined QoS levels to one of their sites, and further indicate that they wish to search for all available services that will satisfy the requirement. The abstraction engine may then abstract, as the requirement abstractions, the two specified QoS levels and the location of the site that service is desired.

Thus, based on the set of requirement abstractions, the abstraction engine 125 may identify one or more inventory class objects from a pool of inventory class objects, which either individually or collectively, satisfy the requirement abstractions. In one set of embodiments, the abstraction engine 125 may generate the pool of inventory class objects dynamically network resources in a dynamically generated network inventory. In other sets of embodiments, the abstraction engine may use an existing pool of inventory class objects. In further embodiments, a combination of both dynamically generated inventory class objects and existing inventory class objects may form the pool of inventory class objects. The abstraction engine 125 may then identify, based on the one or more inventory class objects, a corresponding set of network elements 105 and network resources 110 within each inventory class object. For example, continuing with the previous example, in one set of embodiments, the one or more inventory class objects may include, among others, a service point class object, BRAS functional object, and gateway functional object. Accordingly, each of the identified one or more inventory class objects may include service abstractions indicating at least one of the two specified QoS levels, immediate availability, and location information indicating service to the customer site.

Based on the actual one or more matching network elements 105 and network resources 110, one or more available service offerings utilizing the network elements 105 and network resources 110 may be identified as available and satisfying the service requirements of the customer. In various embodiments, service offerings may include, without limitation, individual products and services, as well as product and service bundles. In one set of embodiments, a single service offering from a single service provider may satisfy the service requirements. In other embodiments, multiple service offerings may be identified that must be combined to satisfy the service requirements. Again, continuing with the previous example, in some embodiments, a single service offering may satisfy both QoS levels, be immediately available, and provide service to the desired service location. In other embodiments, multiple service offerings may be combined, from one or multiple different service providers, to meet the service requirements. The customer may then select, through the customer facing interface of the abstraction engine 125, a service offering or a combination of service offerings. The abstraction engine, upon receiving a selection of the at least one selected service offering, may provision the at least one selected service offering to the service location or otherwise to the customer's premises.

In another set of embodiments, the abstraction engine 125 may identify a best fit solution for satisfying the search requirement. In various embodiments, "best fit" may refer to the matching of requirement abstractions to capabilities in a set of service abstractions for an inventory class object. The connectivity and compatibility of each inventory class object may further be defined, at least in part, by a group based policy (GBP). Accordingly, the abstraction engine 125 may determine what capabilities are needed to satisfy a set of requirement abstractions, and provide a best fit base product or service capable of meeting the service requirement. For example, in one set of embodiments, an inventory class object may define a plurality of network resources by a set of service abstractions characterizing each network resource's properties, interfaces, capabilities, and requirements. A GBP may then further implement rulesets to define connectivity and compatibility between different inventory class objects, and between different service templates. Moreover, the rulesets in a GBP may be reused for different inventory class objects, between different service provider and technology platforms.

In a further set of embodiments, the abstraction engine 125 may identify a service template based on the one or more inventory class objects. Service templates may include one or more interconnected inventory class objects, representing network nodes and interconnections, for the provision of common types of products and services. Thus, a service template may include one or more interconnected inventory class objects needed to provision a service. As will be described in more detail below with respect to FIGS. 2-5, service templates may include, for example, and without limitation, voice service templates, network service templates, video service templates, cable service templates, cloud service templates, NFV service templates, VLAN service templates, carrier Ethernet data services, cellular voice service templates, wireless data service templates, plain old telephone service (POTS) template, Ethernet virtual private line (EVPL) and Ethernet private line (EPL) service templates, or combinations of the above service templates. Based on the service templates, the abstraction engine 125 may then identify one or more service offerings for each of the service templates, which may then individually, or in combination, satisfy the service requirements. In some further embodiments, a given service template may further include a component sub-template. Thus, a service defined by the component sub-template may be a prerequisite service required to provide the service defined by the main service template. Accordingly, the abstraction engine 125 may further identify and provision any thusly identified prerequisite service offerings.

In another set of embodiments, an inventory class object may include, as one of its service abstractions, a requirement for another inventory class object that is not part of a correspondingly identified service template. In response, the abstraction engine 125, identify one or more required network resources corresponding to the required inventory class object, but that was not included in the one or more network resources that were earlier identified. A service offering that including the one or more required network resources, or providing a missing requirement of the service template, may then be identified. In one set of embodiments, missing requirements may be identified directly as a requirement of the service template itself, while in other embodiments, the requirement may be determined from individual inventory class objects of the service template.

In another embodiment, the one or more inventory class objects identified may belong to more than one service template. In such embodiments, the abstraction engine 125 may identify each of the more than one service templates corresponding to the one or more inventory class objects. In one set of embodiments, this may entail the identification of at least a first service template and a second service template respectively including different parts of the one or more inventory classes. Then, based on at least the first and second service templates, the abstraction engine 125 may identify one or more service offerings for each of the first and second service templates. Accordingly, the abstraction engine 125 may determine and present multiple options, permutations, and combinations, spanning across multiple technology platforms and multiple service provider platforms, which satisfy the service requirements of the customer, based on abstractions from the various network elements 105 and network resources 110.

According to various further embodiments, the abstraction engine 125 may further provide a service provider facing interface. The service provider facing interface may be accessible by vendor end device 140, the service provider controlling the abstraction engine 125, or other service providers and carriers. The vendor end device 140 may access the service provider facing interface, like the customer end device 135 accesses the customer facing interface, over the communications network 130. The abstraction engine may receive, through the service provider facing interface, a service template comprising one or more interconnected inventory class objects, from a service provider. As will be described in further detail below, with reference to FIGS. 2-4, the service templates may include, for each of the one or more interconnected inventory class objects, a respective set of service abstractions. In one set of embodiments, the service provider defining the service template may further define each respective set of service abstractions. The abstraction engine 125 may then determine whether network elements 105 or network resources 110 are available that may satisfy the respective sets of service abstractions of each of the one or more interconnected inventory class objects. Similar to the previously described embodiments, the service provider may utilize existing inventory class objects, or define new inventory class objects. Then, based on the available network elements 105 and resources 110, the abstraction engine may create one or more new service offerings, based on the service template, and utilizing the one or more network elements 105 and resources 110. In another set of embodiments, the abstraction engine 125 may identify at least one external network resource, available from a second service provider different, excluded from the one or more network elements 105 and network resources 110. Thus, the abstraction engine 125 may identify any requisite service offerings needed to provision the service provider defined service template.

Accordingly, the searchable best fit abstraction system 100 provides a searchable best fit abstraction framework that allows both customers and service providers to search and design service offerings, spanning across different technology platforms, services, and service providers. In conventional, prior art systems, for example, no solutions exist to search for (as a customer), or design (as a service provider), products and service, based around common service requirement abstractions, applicable across technologies, devices, vendors, and service providers. For example, conventional systems do not offer a solution to search for products and services, based on an abstracted requirement such as OAM functionality requirement abstraction or service level agreement (SLA) requirement abstraction. Instead, network capabilities for each individual network element 105 or network resource must be searched individually, or by shared technology platform. For example, in one set of embodiments, a service request may request certain OAM and SLA functionality, which in turn, the abstraction engine 125 may map to a set of requirement abstractions corresponding to the OAM and SLA functionality. A cloud service may rely on a host/client based architecture to track performance and SLA compliance, network elements 105 and resources 110 on an IP network may utilize IP/multiprotocol label switching (MPLS) OAM, network elements 105 and resources 110 in a metro Ethernet forum (MEF) carrier Ethernet network may rely on Ethernet OAM, while voice service may utilize a different OAM solution altogether. The abstraction engine may then, based on an inventory class object and corresponding service abstractions, may search and identify the one or more network elements 105, network resources 110, service templates, and service offerings, based on the service abstractions and set of requirement abstractions. Under the conventional framework regime, this would be impossible, requiring individual determinations for each network element 105 and network resource 110, for each technology platform and service provider, and for each product and service.

Figure 2:
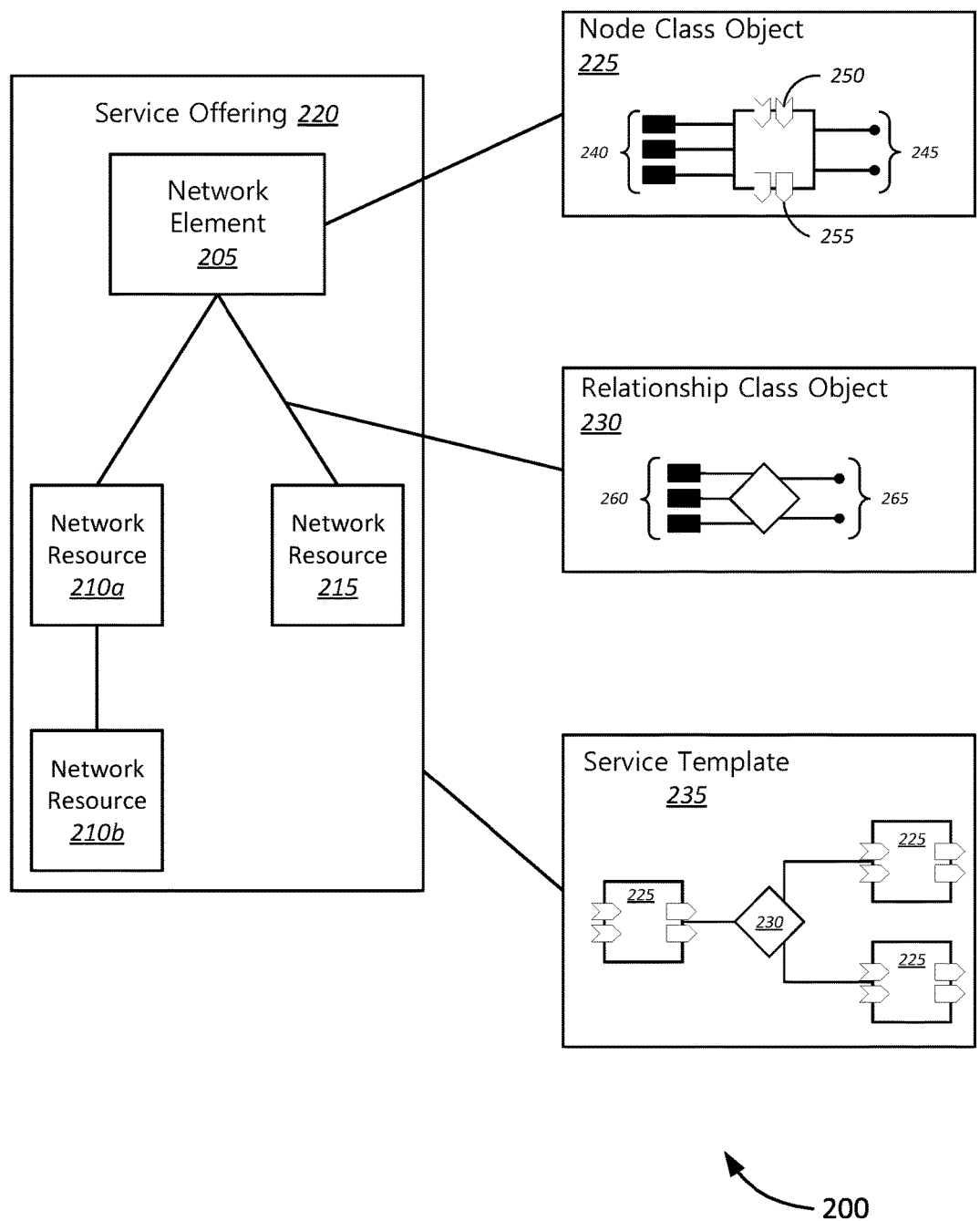
FIG. 2 is a schematic diagram of various abstractions, inventory class objects, and service templates, in accordance with various embodiments.

FIG. 2 illustrates a schematic visualization 200 of a service offering 220, network element(s) 205, network resources 210*a*, 210*b*, 215, and corresponding inventory class objects 225, 230, and service template 235. According to various embodiments, the service offering 220 may include network element 205, communicatively coupled to network resource 210*a* and network resource 215. The network resource 210*a* may further be in communication with a network resource 210*b*. The network element 205 may include various network devices, nodes, and the like. Similarly, the network resources 210*a*, 210*b*, 215 may include other network elements, devices, nodes, interfaces, communication media, hardware, and software resources. The service offering 220, may correspond to a service utilizing network element 205, and network resources 210*a*, 210*b*, 215, and as defined by service template 235. For example, in one set of embodiments, the service offering 220 may correspond to residential internet service from an internet service provider. Accordingly, the network element 205 may correspond to, without limitation, a DSLAM, CMTS, or OLT. The network element 205 may then be coupled to network resource 210*a*, which may include, without limitation, an NID, such as an ONT. The network resource 210*a* may then be further coupled to network resource 210*b*, which may include, without limitation, a gateway device such as a modem or STB. Similarly, the network resource 215 may include, without limitation, a gateway device such as a DSL or cable modem, in direct communication with a DSLAM or CMTS network element 205 respectively.

According to various embodiments, the service offering 220 may correspond to, and be defined by, service template 235 having one or more interconnected inventory class objects. Thus, inventory class objects may include, but are not limited to, node class objects 225 and relationship class objects. For example, the service template 235 may include a node class object 225 coupled to two additional node class objects 225 via a relationship class object 230. Accordingly, in the above example, node class objects 225 may include network nodes and devices, such as, without limitation, service point class objects, BRAS functional objects, a combined DSLAM and CMTS functional object, DSLAM functional objects and CMTS functional objects individually, residential gateway (RG) functional objects, and the like. Relationship class objects 230 may include one or more of communication media and protocols employed between the node class objects 225. Accordingly, continuing with the residential internet service example, relationship class objects 230 may include, without limitation, a logical connectivity class object, communication media class object, optical fiber class object, DSL class object, and the like.

In various embodiments, each node class object 225 may include a set of service abstractions. The service abstractions may include one or more properties 240, interfaces 245, capabilities 250, and requirements 255. In some embodiments, the service abstractions for node class objects 225 may include any or all of the one or more properties 240, interfaces 245, capabilities 250, and requirements 255. Similarly, the relationship class objects 230 may include one or more properties 260, interfaces 265, capabilities, and requirements. In one set of embodiments, the relationship class object 230 may include properties 260 and interfaces 265, while excluding requirements and capabilities. Accordingly, in some embodiments, service templates 235 may be abstracted from an existing service offering 220, based on node class objects 225 and relationship class objects 230 extracted from network elements 205, and network resources 210a, 210b, 215. In other embodiments, a new service template 235 may be defined by creating various node class objects 225 and relationship class objects 230—and created from one or more corresponding network elements 205, and network resources 210a, 210b, 215. Thus, various inventory class objects may be interconnected, based on service abstractions, such as capabilities 250 and requirements 255, wherein the capabilities 250 of one inventory class object may satisfy the requirements 255 of another connected inventory class object.

In various embodiments, a single inventory class object may correspond to a combination of more than one network element 205 or network resource 210a, 210b, 215. Furthermore, multiple types of network elements 205 or network resources 210a, 210b, 215 may be included in a single node class object 225. For example, in one set of embodiments, the node class object 225 may be, for example, an RG functional object including service abstractions for a residential gateway type of network resources. Accordingly, the service abstractions may include properties 240, interfaces 245, capabilities 250, and requirements 255 applicable to DSL modems, cable modems, set top boxes, voice over IP (VoIP) adapters, and the like. However, a separate ONT and modem may not individually contain each of the service abstractions, but the combination of the ONT and modem may collectively include each of the service abstractions. Thus, a combination of network resource 210a and network resource 210b may correspond to a single node class object 225, whereas network resource 215 and network element 205 may each individually correspond to a respective node class object 225. Similarly, in some embodiments, one or more network resources 210a, 210b, 215 may correspond to a single relationship class object 230.

According to one set of embodiments, continuing with the residential internet service example, the service template 235 may further correspond to a service requirement, such as a promised internet speed. Accordingly, each of node class objects 225 and relationship class objects may include, as part of their service abstractions, properties 240, 260, interfaces 245, 265, capabilities 250, and requirements 255 for provisioning the promised internet speed. Network elements 205, and network resources 210a, 210b, 215 may therefore satisfy the service abstractions defined for the inventory class objects 225, 230. For example, network resources 210a, 210b, 215 may include a DSLAM, CMTS, OLT, ONT, DSL modem, cable modem, or other residential gateway, and corresponding connections, communication protocols, and communication media, capable of supporting the promised internet speed.

According to one set of embodiments, the inventory class objects, such as the node class objects 225, and relationship class objects 230, may be abstracted, by an abstraction engine, from the network elements 205 and network resources 210a, 210b, 215, based on the actual properties 240, interfaces 245, capabilities 250, and requirements 255. In some embodiments, a service template 235 may be abstracted from the one or more inventory class objects 225. In other sets of embodiments, a service provider may define node class objects 225, relationship class objects 230, and service templates 235. In various embodiments, the network elements 205 and network resources 210a, 210b, 215 may belong to different service providers and utilize different technology platforms, but may commonly share service abstractions, as defined in the various inventory class objects.

Figure 3:
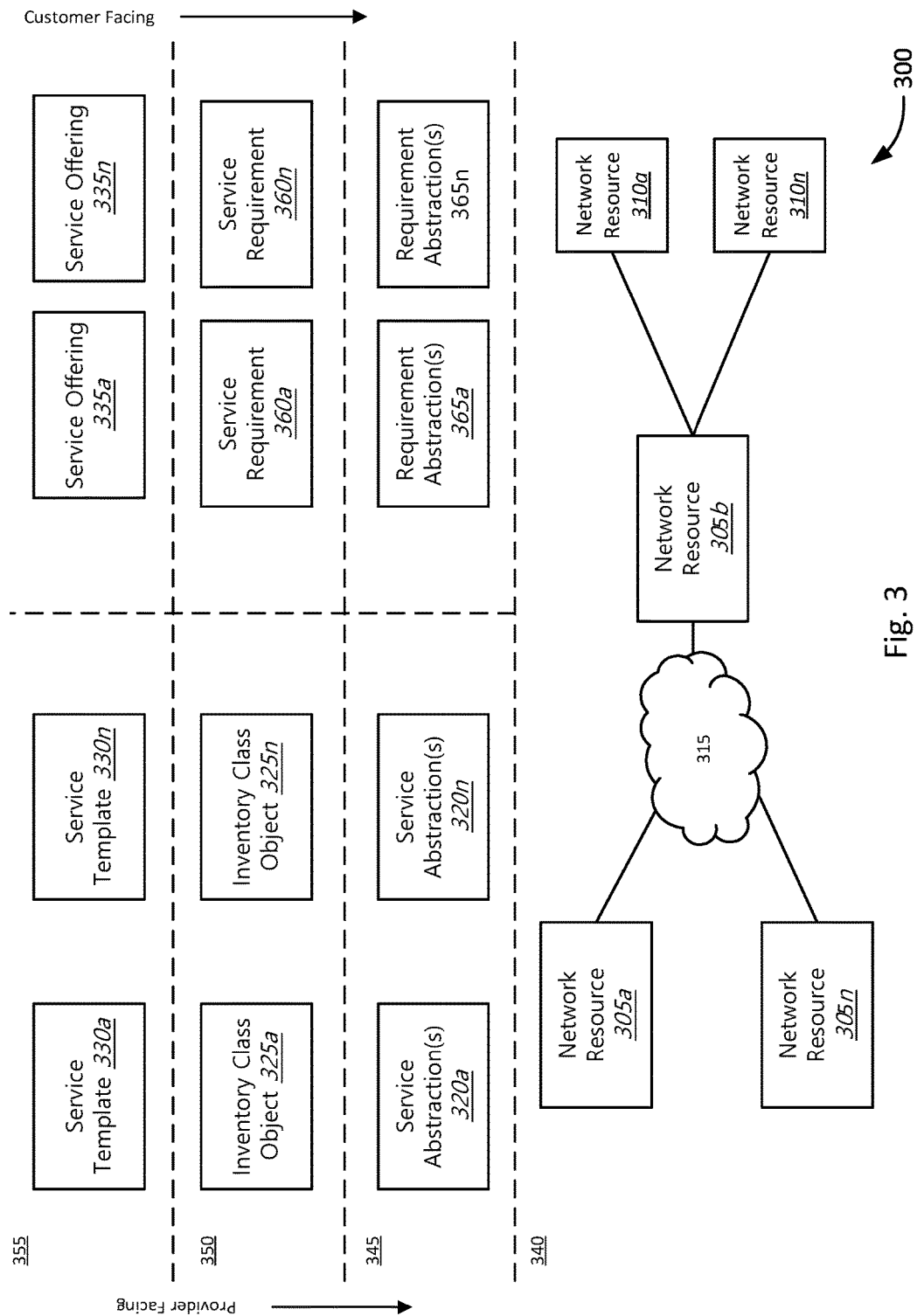
FIG. 3 is a schematic diagram of different layers of abstraction, in accordance with various embodiments.

FIG. 3 is a schematic visualization 300 of the various layers of abstraction of a searchable best fit abstraction framework, in accordance with various embodiments. The layers include both a customer facing and service provider facing side for each of the various layers 340, 345, 350, 355. In various embodiments, the layers may include a network resource layer 340, including a plurality of available network resources 305a through 305n (collectively 305), and 310a through 310n (collectively 310). Each of the network resources correspond to, and may be accessible by one or more of a network inventory server or abstraction engine, via a communications network 315. In one set of embodiments, network resources 305b may further be in further communication with one or more additional network resources 310. An abstractions layer 345 may further be provided, including service abstractions 320a-n (collectively 320), and requirement abstractions 365a-n (collectively 365). Accordingly, the abstractions layer 345 may include both service abstractions 320 of various inventory class objects 325a-n, and requirement abstractions 365 abstracted from service requirements 360a-n (collectively 360). The inventory class objects 325 and service requirements 360 may belong to intermediate layer 350, from which the respective abstractions 320, 365 are defined or abstracted, respectively. The composite layer 355 may include service templates 330a-n (collectively 330) that include one or more interconnected inventory class objects 325, and service offerings 335a-n (collectively 335), for which service requirements are specified. Thus, in a general sense, the searchable best fit abstraction framework progresses in roughly opposite directions for the customer and provider facing sides.

In one set of embodiments, for example, a customer may submit a search query for a service offering 335, the search query including at least one service requirement 360. An abstraction engine may, from the service requirement, abstract a set of one or more requirement abstractions 365. Based on the set of one or more requirement abstractions, the abstraction may further identify one or more inventory class objects 325 having service abstractions 320n meeting the set of one or more requirement abstractions 365. Then, based on the one or more inventory class objects 325, the abstraction may further identify a service template 330, or one or more network resources 305, 310. From the service template 330 or one or more network resources 305, 310, one or more service offerings 335 satisfying the service requirements may be identified and provisioned by the abstraction engine.

In another set of embodiments, a service provider may submit a service template 330 for a new service offering 335. The service provider may define a service template 335 from one or more inventory class objects 325. The service provider may further define the one or more inventory class objects 325 by defining one or more service abstractions 320. Then, based on the one or more service abstractions, the abstraction engine may determine one or more network resources 305, 310 that may be connected and provide functionality as defined by the one or more inventory class objects 325 and service template 330. Accordingly, one or more of network resources 305, 310 thusly determined to fit within the inventory class object 325 and service template 330 may be utilized to create one or more service offerings 335.

Figure 4:
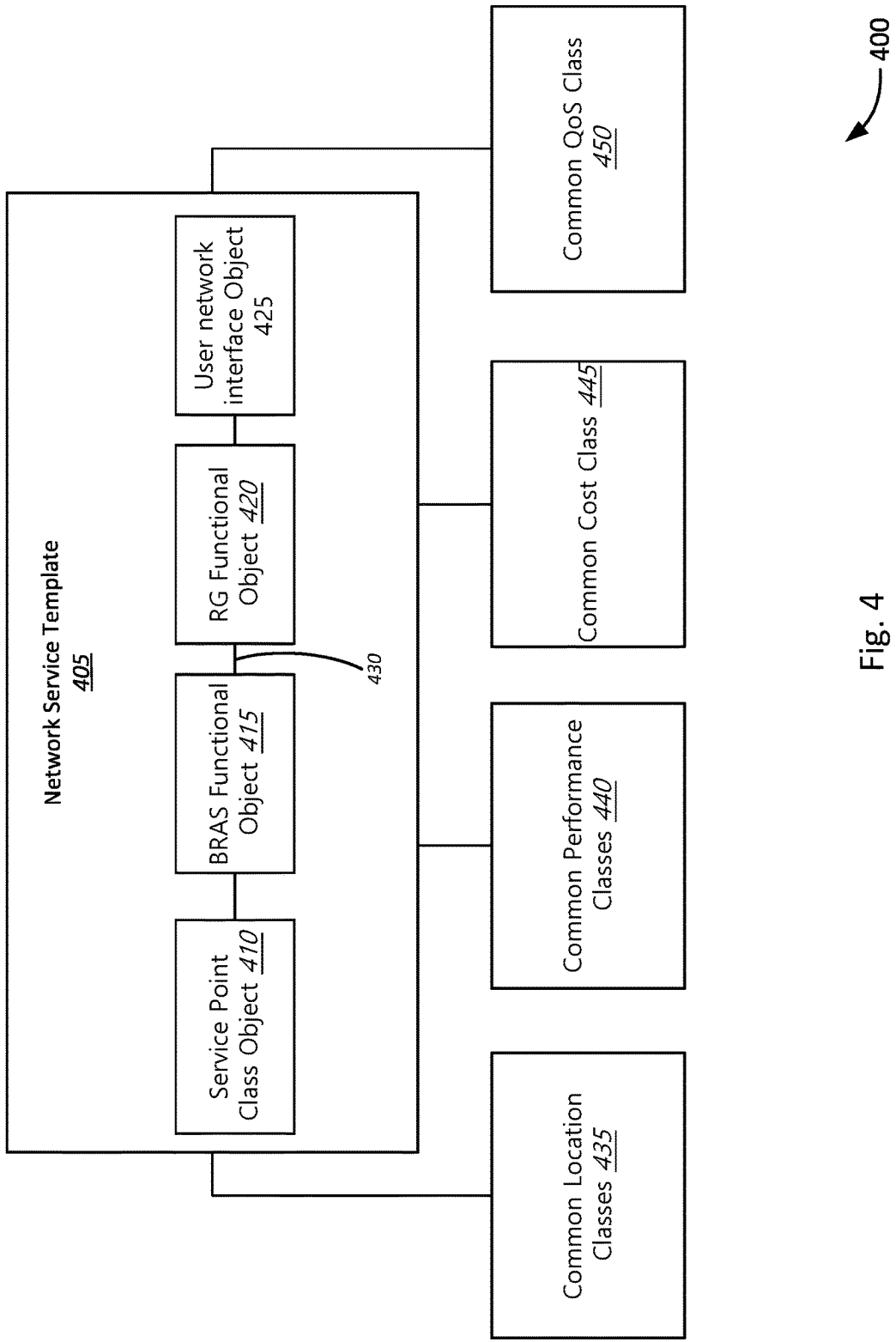
FIG. 4 is a schematic diagram of service template construction, in accordance with various embodiments.

FIG. 4 is a schematic diagram 400 of a network service template 405, in accordance with various embodiments. The network service template 405 may include a various inventory class objects including a service point class object 410, BRAS functional object 415, connection object 430, RG functional object 420, and UNI object 425. The above inventory class objects may respectively include a respective set of service abstractions, including, without limitation, properties, interfaces, capabilities, and requirements. The set of service abstractions may be created from a pool of common abstractions, including, without limitation, a common location class 435, common performance class 440, common cost class 445, and common QoS class 450.

According to various embodiments, a network service template 405 may be created having a service location boundary requirement. The service location boundary requirement, for example, may require all personal data property to be stored physically within Country A. Accordingly, for each of the service point class object 410, BRAS functional object 415, connection object 430, RG functional object 420, and UNI object 425 may include in their respective sets of service abstractions, a common location class 435 indicating location information for Country A. Accordingly, the service template 405 may ensure that all personal data is kept within the service location boundary requirement for Country A.

In an additional set of embodiments, costs may be assigned for a network service template 405, or any of the service point class object 410, BRAS functional object 415, connection object 430, RG functional object 420, and UNI object 425. For example, in one set of embodiments, a service offering defined by the network service template 405 may have, in their respective sets of service abstractions, a common cost class 445 indicating pricing or cost information for each individual service point class object 410, BRAS functional object 415, connection object 430, RG functional object 420, and UNI object 425. In other embodiments, overall costs may be assigned to the network service template itself. In further embodiments, the common cost class 445 may indicate a range, upper limit, or lower limit of costs for a network resource. In other embodiments, cost or pricing information may be extracted from the network resource, and costs for the service offering determined based on abstracted pricing information for each of the network resources, providing an actual cost of providing the service offering, on a per-network resource basis.

In a further set of embodiments, inventory class object to inventory class object requirements may be defined. For example, a customer may request, as part of their service requirements, VoIP services. VoIP services may require a high QoS class. Thus, only service point class object 410, BRAS functional object 415, connection object 430, RG functional object 420, and UNI object 425 having service abstractions with a common performance class 440 indicating the requisite QoS class may be identified or utilized. In some embodiments, multiple different services may be required to provision VoIP service, for example, both a voice service and network service. Accordingly, voice service offerings may require, as part of a voice service template, or in the service abstractions of one or more inventory class objects of the voice service template, a network service template. Thus, only network service offerings defined by network service templates having high QoS capabilities may be presented to a customer, or defined by a service provider.

Figure 5:
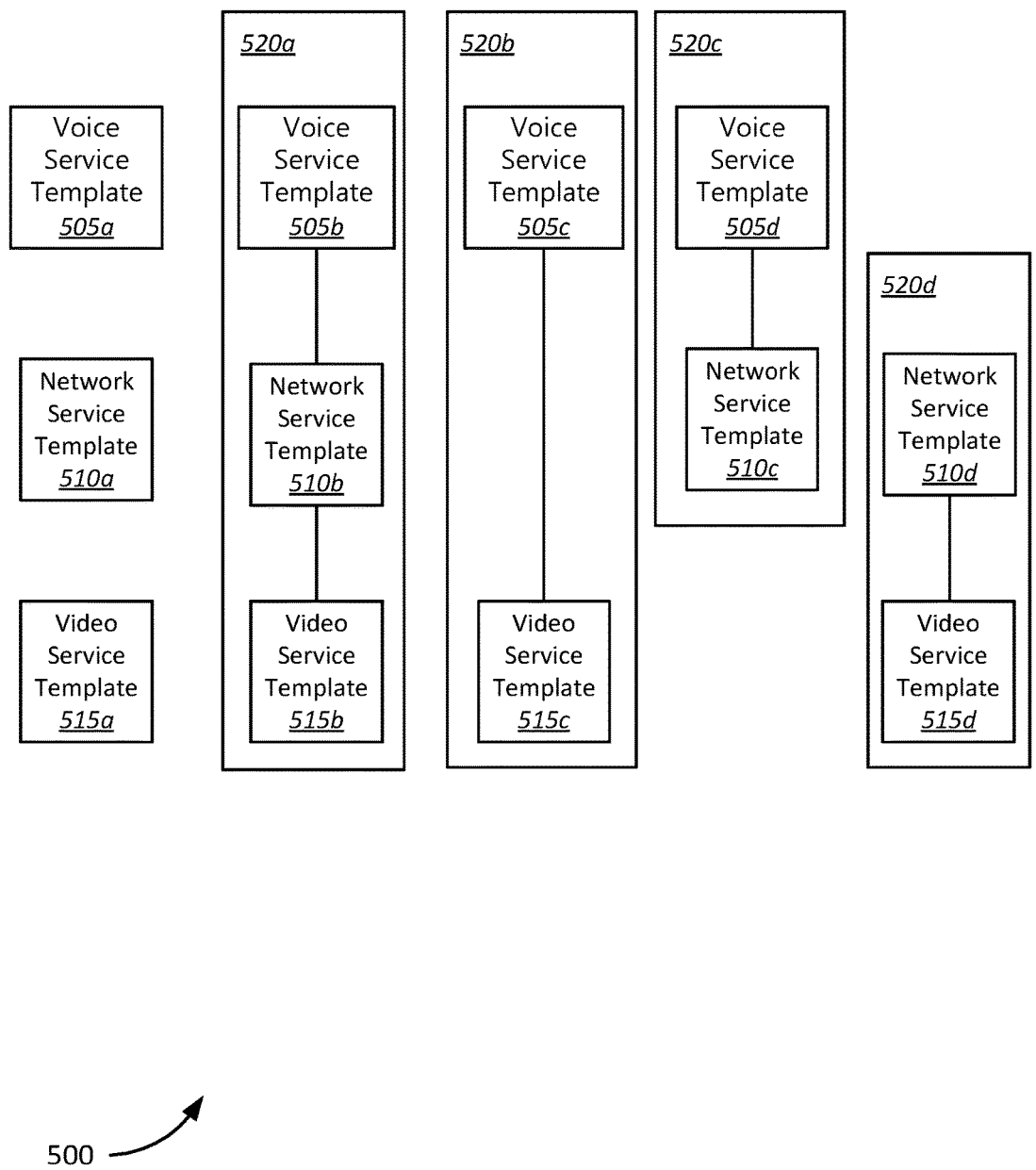
FIG. 5 is a schematic diagram of service template and component sub-template dependencies, in accordance with various embodiments.

For example, FIG. 5 illustrates various schematic arrangements 500 of service templates and service template combinations, in accordance with various embodiments. For example, various service templates may be identified and provisioned to the customer, based on a customer's service requirements. For example, in one set of embodiments, the service templates may include, without limitation, video service templates 505a-d (collectively 505), network service templates 510a-d (collectively 510), and video service templates 515a-d (collectively 515). Some of the voice service templates 505, network service templates 510, and video service templates 515 may be component sub-templates, included as part of a main bundled service template 520a-d (collectively 520).

For example, in one set of embodiments, a customer may specify VoIP service as a service requirement. Accordingly, a voice service template 505 and network service template 510 may be required, each of the voice service template 505 and network service template having service abstractions satisfying a set of requirement abstractions required to provide the VoIP service. Accordingly, a customer may be presented with one or more service offerings defined by voice service template 505a, network service template 510a, bundled service template 520a, 520c, a combination of bundled service templates 520b with network service template 510a, or combination of bundled network service 520d and voice service template 505a. In some embodiments, individual video service offerings defined by video service template 515a may not be returned, as video service is not required to provision VoIP service. It will be understood by those skilled in the art that other permutations and combinations of service templates and bundled service templates may be utilized, as appropriate, to fulfill a customer's service requirements. Accordingly, the above embodiments should not be considered limiting to only voice 505, network 510, and video 515 service templates, or bundles 520 of voice 505, network 510, and video 515 service templates.

Figure 6:
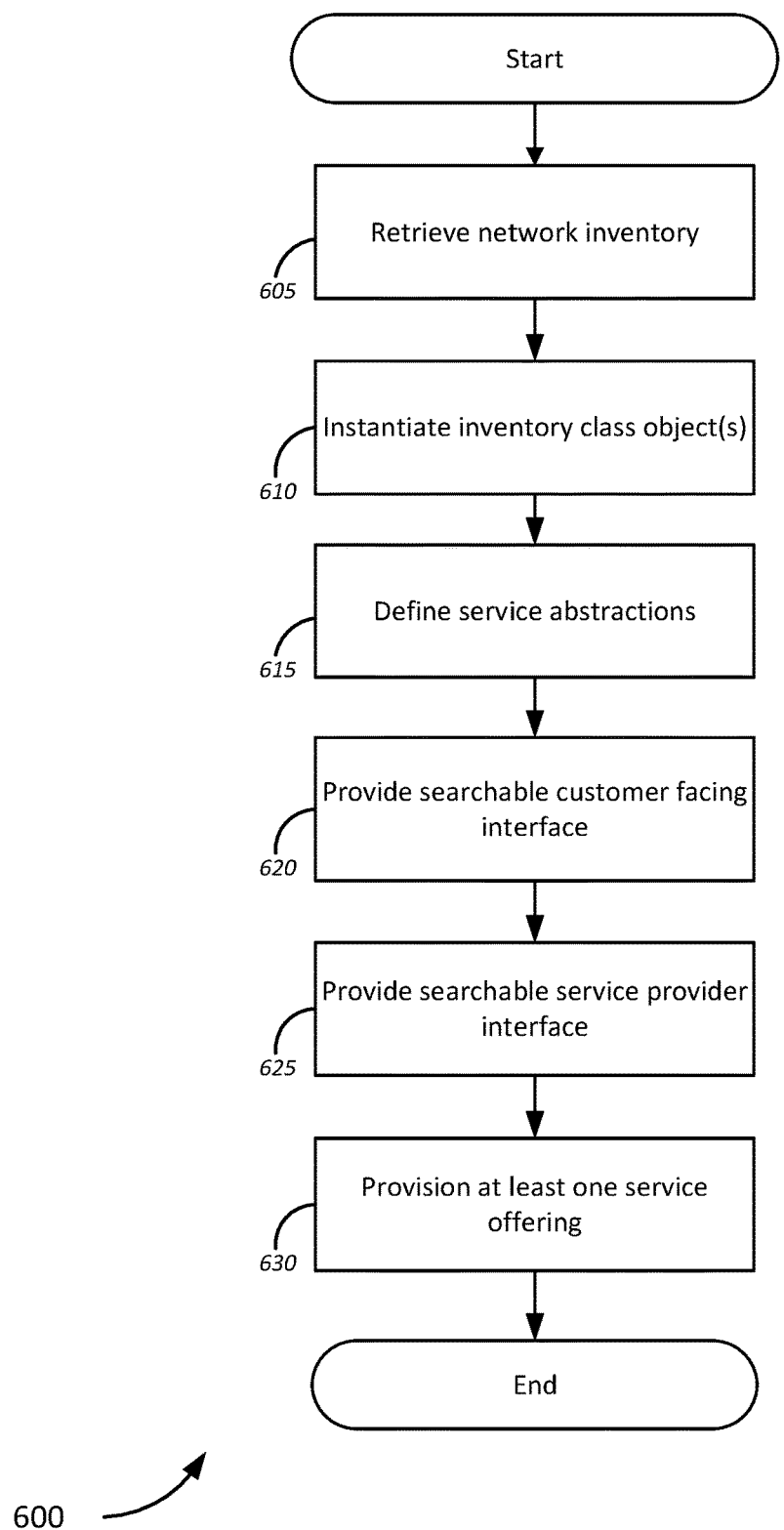
FIG. 6 is a flow diagram of a method for implementing a searchable best fit abstraction system, in accordance with various embodiments.

FIG. 6 illustrates a flow diagram of a method 600 for implementing a searchable best fit abstraction catalog driven service delivery system, in accordance with various embodiments. The method 600 begins at block 605, by retrieving, from a network inventory server, a network inventory of network resources. In various embodiments, each of the network resources may be communicatively coupled to the network inventory server. A searchable best fit abstraction engine may further be communicatively coupled to a network inventory server to retrieve the network inventory from the network inventory server, or receive the network inventory transmitted by the network inventory server. In one set of embodiments, the network inventory may be generated dynamically by polling each network resource, accessible by the network inventory server. In other embodiments, an existing network inventory may be continually updated, for example, where network resources may automatically register with the network inventory server.

At block 610, the searchable best fit abstraction engine may instantiate an inventory class object for at least one network resource in the network inventory. In various embodiments, the inventory class object may include a set of service abstractions, including properties, interfaces, capabilities, and requirements for a class of network resources. In some embodiments, the searchable best fit abstraction engine may instantiate an inventory class object based on abstractions from one or more network resources. In other sets of embodiments, inventory class objects may be instantiated from a pool of common inventory class objects.

At block 615, the searchable best fit abstraction engine may define, for the inventory class object, a set of service abstractions for the inventory class object. In various embodiments, the service abstractions may be defined from a pool of common service abstractions. In other embodiments, the service abstractions may be abstracted from the properties, interfaces, capabilities, and requirements of one or more network resources. In further embodiments, a service provider may define the set of service abstractions as part of a service template for a service offering.

At block 620, the searchable best fit abstraction engine may provide a customer facing interface, allowing a customer to identify available service offerings based on one or more service requirements. Similarly, at block 625, the searchable best fit abstraction engine may provide a service provider facing interface. In various embodiments, the service provider facing interface may allow a service provider to define one or more service offerings based on a service template.

At block 630, the searchable best fit abstraction engine may then provision at least one service offering, either meeting the service requirement of the customer, or defined by a service provider's service template. In various embodiments, this may include the provisioning of a service offering via one or more network resources that are available to a customer and satisfying the customer's one or more service requirements. In one set of embodiments, service offerings may further be provisioned based on one or more service templates identified as being required to provision a desired service or to satisfy a service requirement.

Figure 7:
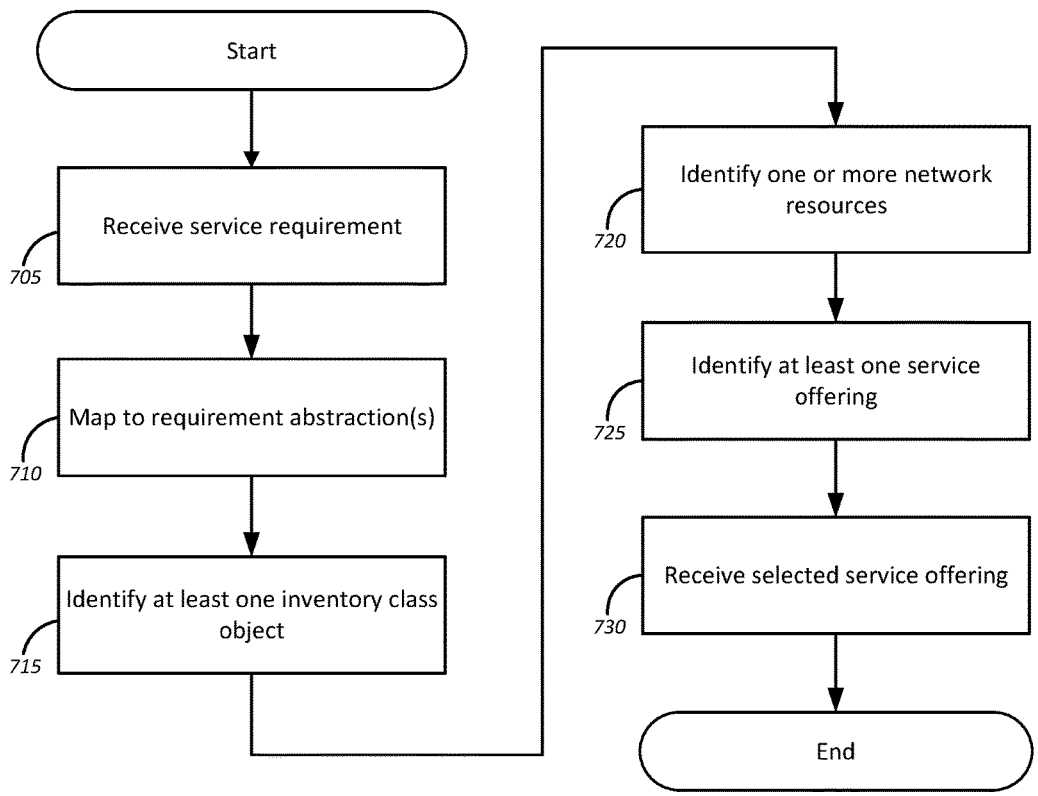
FIG. 7 is a flow diagram of a method for catalog driven service delivery from customer input, in accordance with various embodiments.

FIG. 7 illustrates a flow diagram of a method 700 for catalog driven service delivery from customer input, in accordance with various embodiments. The method 700 begins, at block 705, by receiving, via the customer facing interface, a search query from the customer, including at least one service requirement. In various embodiments, the customer facing interface may include, without limitation, a web portal or application, accessible by a customer end device, and configured to receive the customer's input. In some embodiments, service requirements may be abstracted from a search query, such as, without limitation, in a natural language query, semantic query, or the like. In other embodiments, the service requirements may be indicated explicitly, such as, without limitation, in a parametric query, selection-based query where the service requirements are selected by a user, or the like.

At block 710, the searchable best fit abstraction engine may map each service requirement in the search query to a respective set of one or more requirement abstractions. In various embodiments, the requirement abstractions may indicate one or more required capabilities in order to satisfy the service requirement. In one set of embodiments, the abstraction engine may map the service requirement to a single requirement abstraction that may alone be able to meet the service requirement. In other embodiments, the service requirement may be mapped to a set of multiple requirement abstractions that are needed to fulfill a service requirement.

At block 715, the searchable best fit abstraction engine may identify at least one inventory class object based on the set of requirement abstractions. In various embodiments, the searchable best fit abstraction may determine, for each requirement abstraction in the set of requirement abstractions, one or more inventory class objects having service abstractions, which individually or in combination, satisfy the set of requirement abstractions. In one set of embodiments, the one or more inventory class objects may be identified from a pool of common inventory class objects, or may generate inventory class objects dynamically from one or more network resources.

At block 720, the searchable best fit abstraction engine may then identify a set of one or more network resources fitting each of the one or more inventory class objects. In some embodiments, a single inventory class object may correspond to a combination of more than one network resource. In further embodiments, each inventory class object may further include multiple types of network resources. For example, in one set of embodiments, an inventory class object may include a set of service abstractions that are met by a combination of two or more network resources. In other sets of embodiments, multiple network resources may exhibit each of the service abstractions of a single inventory class object.

At block 725, the searchable best fit abstraction engine may identify at least one service offering utilizing the one or more network resources. In various embodiments, based on a set of identified one or more network resources, one or more available service offerings may be identified as both available and satisfying the service requirements of the customer. In various embodiments, service offerings may include, without limitation, individual products and services, as well as product and service bundles. In one set of embodiments, a single service offering from a single service provider may satisfy the service requirements. In other embodiments, a service offering may rely on a combination of multiple services provided by different service providers, in order to satisfy the service requirements.

At block 730, the searchable best fit abstraction engine may receive a selection of at least one selected service offering from the customer. In various embodiments, the selected service offering, or a combination of service offerings, may be provisioned to a service. In one set of embodiments, the customer may make their selection through the customer facing interface. The abstraction engine, upon receiving the selection, may provision the at least one selected service offering to a service location, including, without limitation, a location specified as a service requirement or a customer's premises, such as a residence or business.

Figure 8:
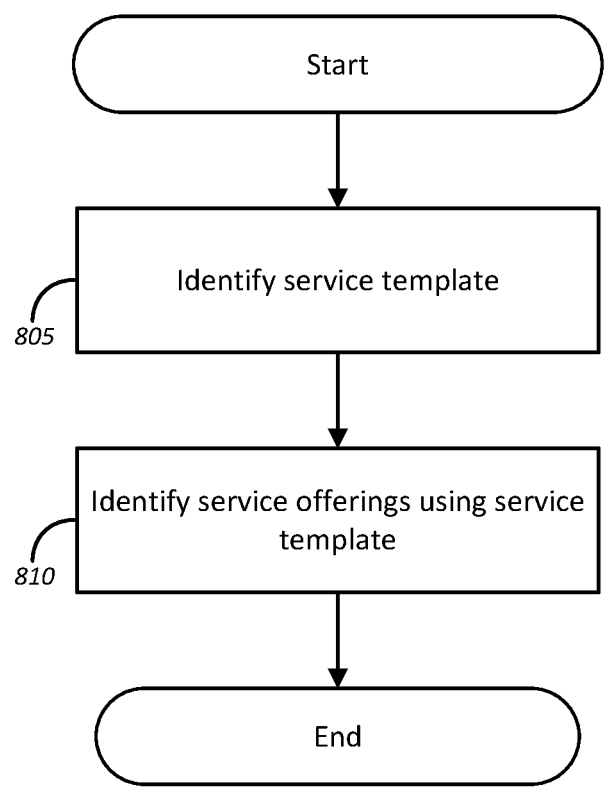
FIG. 8 is a flow diagram of a method for identifying service templates in response to a customer query for catalog driven service delivery, in accordance with various embodiments.

FIG. 8 illustrates a flow diagram of a method 800 for identifying service templates in response to a customer query for catalog driven service delivery, in accordance with various embodiments. The method 800 begins, at block 805, by identifying, via the searchable best fit abstraction engine, a service template. In various embodiments, the service template may include one or more interconnected inventory class objects, including at least one inventory class object identified based on the set of requirement abstractions. The one or more interconnected inventory class objects may represent network nodes and interconnections, defining one or more network resources needed to provision a type of product or service.

At block 810, the searchable best fit abstraction engine may then identify, based on the service template, one or more service offerings defined by the service template. In various embodiments, a single service template may include one or more different service offering, which may, individually or in combination, satisfy the service requirements. In some further embodiments, a given service template may further include a component sub-template. A service defined by the component sub-template may be a prerequisite service required to provision the service defined by the main service template. Accordingly, the abstraction engine may further identify and provision any prerequisite service offerings. In a further set of embodiments, the one or more inventory class objects identified may belong to more than one service template. Thus, in some embodiments, the searchable best fit abstraction engine may further identify each of the more than one service templates corresponding to the one or more inventory class objects. In one set of embodiments, this may entail the identification of at least a first service template and a second service template respectively including different parts of the one or more inventory classes.

Figure 9:
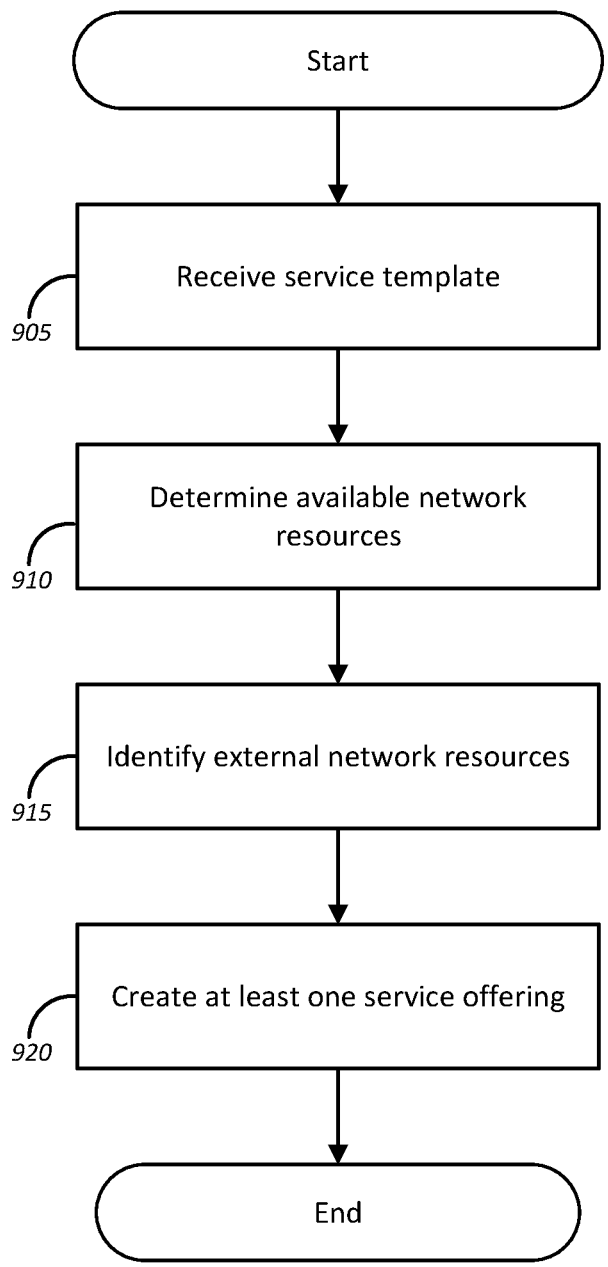
FIG. 9 is a flow diagram of a method for catalog driven design and delivery of service offerings, in accordance with various embodiments.

FIG. 9 illustrates a flow diagram of a method 900 for catalog driven service template design and service offering delivery, in accordance with various embodiments. The method 900 begins, at block 905, by receiving, via the searchable best fit abstraction engine, a service template. In various embodiments, a service provider may be able to define and provide a service template via the service provider facing interface. In some embodiments, the service provider may be able to define the service template through the service provider facing interface itself. In various embodiments, the service provider defined service template may include one or more interconnected inventory class objects, each of the one or more interconnected inventory class objects having a respective set of service abstractions. In some embodiments, the service provider may further define each respective set of service abstractions for each of the one or more inventory class objects.

At block 910, the searchable best fit abstraction engine may determine whether at least one network resource is available that fits an inventory class object that satisfies the respective set of service abstractions. In some embodiments, one or a combination of multiple network resources may satisfy the respective set of service abstractions for the inventory class object.

At block 915, the searchable best fit abstraction engine may further identify, based on the one or more network resources, an at least one external network resource. In various embodiments, the at least one external network resource may be available from a second service provider different from the service provider defining the service template.

At block 920, the searchable best fit abstraction engine may create an at least one service offering utilizing the one or more identified network resources configured according to the service template. In one set of embodiments, the service offering may include the at least one external network resource, or a prerequisite service utilizing the at least one external network resource.

Figure 10:
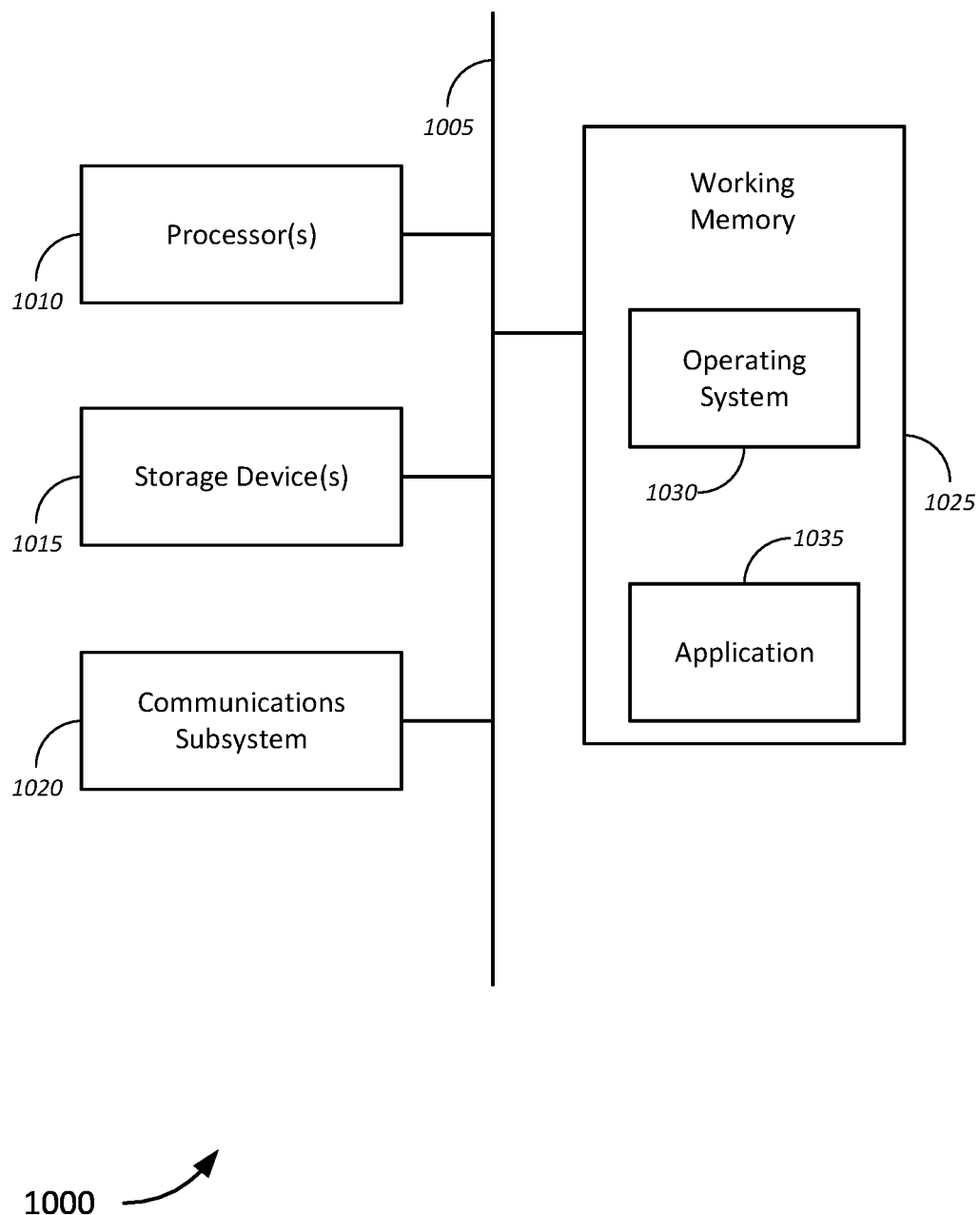
FIG. 10 is a schematic block diagram of computer hardware for a searchable best fit abstraction engine, in accordance with various embodiments.

FIG. 10 is a schematic block diagram of computer hardware for a searchable best fit abstraction engine, in accordance with various embodiments. FIG. 10 provides a schematic illustration of one embodiment of a computer system 1000 that can perform the methods provided by various other embodiments, as described herein, and/or can perform the searchable best fit abstraction engine, customer and vendor end devices, inventory server, various network elements and resources, or any other computer systems as described above. It should be noted that FIG. 10 is meant only to provide a generalized illustration of various components, of which one or more (or none) of each may be utilized as appropriate. FIG. 10, therefore, broadly illustrates how individual system elements may be implemented in a relatively separated or integrated manner.

The computer system 1000 includes a plurality of hardware elements that can be electrically coupled via a bus 1005 (or may otherwise be in communication, as appropriate). The hardware elements may include one or more processors 1010, including, without limitation, one or more general-purpose processors and/or one or more special-purpose processors (such as digital signal processing chips, graphics acceleration processors, and/or the like). In general, embodiments can employ as a processor any device, or combination of devices, that can operate to execute instructions to perform functions as described herein. Merely by way of example, and without limitation, any microprocessor (also sometimes referred to as a central processing unit, or CPU) can be used as a processor, including without limitation one or more complex instruction set computing (CISC) microprocessors, such as the single core and multicore processors available from Intel Corporation™ and others, such as Intel's X86 platform, including, e.g., the Pentium™, Core™, and Xeon™ lines of processors. Additionally and/or alternatively, reduced instruction set computing (RISC) microprocessors, such as the IBM Power™ line of processors, processors employing chip designs by ARM Holdings™, and others can be used in many embodiments. In further embodiments, a processor might be a microcontroller, embedded processor, embedded system, SoC or the like.

As used herein, the term "processor" can mean a single processor or processor core (of any type) or a plurality of processors or processor cores (again, of any type) operating individually or in concert. Merely by way of example, the computer system 1000 might include a general-purpose processor having multiple cores, a digital signal processor, and a graphics acceleration processor. In other cases, the computer system might 1000 might include a CPU for general purpose tasks and one or more embedded systems or microcontrollers, for example, to run real-time functions. The functionality described herein can be allocated among the various processors or processor cores as needed for specific implementations. Thus, it should be noted that, while various examples of processors 1010 have been described herein for illustrative purposes, these examples should not be considered limiting.

The computer system 1000 may further include, or be in communication with, one or more storage devices 1015. The one or more storage devices 1015 can comprise, without limitation, local and/or network accessible storage, or can include, without limitation, a disk drive, a drive array, an optical storage device, a solid-state drive, flash-based storage, or other solid-state storage device. The solid-state storage device can include, but is not limited to, one or more of a random access memory (RAM) or a read-only memory (ROM), which can be programmable, flash-updateable, or the like. Such storage devices may be configured to implement any appropriate data stores, including, without limitation, various file systems, database structures, or the like.

The computer system 1000 might also include a communications subsystem 1020, which can include, without limitation, a modem, a network card (wireless or wired), a wireless programmable radio, or a wireless communication device. Wireless communication devices may further include, without limitation, a Bluetooth device, an 802.11 device, a WiFi device, a WiMax device, a WWAN device, cellular communication facilities, or the like. The communications subsystem 1020 may permit data to be exchanged with a customer premises, residential gateway, authentication server, a customer facing cloud server, network orchestrator, host machine servers, other network elements, or combination of the above devices, as described above. Communications subsystem 1020 may also permit data to be exchanged with other computer systems, and/or with any other devices described herein, or with any combination of network, systems, and devices. According to some embodiments, the network might include a local area network (LAN), including without limitation a fiber network, or an Ethernet network; a wide-area network (WAN); a wireless wide area network (WWAN); a virtual network, such as a virtual private network (VPN); the Internet; an intranet; an extranet; a public switched telephone network (PSTN); an infra-red network; a wireless network, including without limitation a network operating under any of the IEEE 802.11 suite of protocols, the Bluetooth protocol, or any other wireless protocol; or any combination of these or other networks.

In many embodiments, the computer system 1000 will further comprise a working memory 1025, which can include a RAM or ROM device, as described above. The computer system 1000 also may comprise software elements, shown as being currently located within the working memory 1025, including an operating system 1030, device drivers, executable libraries, and/or other code. The software elements may include one or more application programs 1035, which may comprise computer programs provided by various embodiments, and/or may be designed to implement methods and/or configure systems provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 1025 described above. In some cases, the storage medium might be incorporated within a computer system, such as the system 1000. In other embodiments, the storage medium might be separate from a computer system (i.e., a removable medium, such as a compact disc, etc.), and/or provided in an installation package, such that the storage medium can be used to program, configure and/or adapt a general purpose computer with the instructions/code stored thereon. These instructions might take the form of executable code, which is executable by the computer system 1000 and/or might take the form of source and/or installable code, which, upon compilation and/or installation on the computer system 1000 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 1000) to perform methods in accordance with various embodiments of the invention. According to a set of embodiments, some or all of the procedures of such methods are performed by the computer system 1000 in response to processor 1010 executing one or more sequences of one or more instructions (which might be incorporated into the operating system 1030 and/or other code, such as an application program 1035) contained in the working memory 1025. Such instructions may be read into the working memory 1025 from another computer readable medium, such as one or more of the storage device(s) 1015. Merely by way of example, execution of the sequences of instructions contained in the working memory 1025 might cause the processor(s) 1010 to perform one or more procedures of the methods described herein.

The terms "machine readable medium" and "computer readable medium," as used herein, refer to any medium that participates in providing data that causes a machine to operation in a specific fashion. In an embodiment implemented using the computer system 1000, various computer readable media might be involved in providing instructions/code to processor(s) 1010 for execution and/or might be used to store and/or carry such instructions/code (e.g., as signals). In many implementations, a computer readable medium is a non-transitory, physical and/or tangible storage medium. In some embodiments, a computer readable medium may take many forms, including but not limited to, non-volatile media, volatile media, or the like. Non-volatile media includes, for example, optical and/or magnetic disks, such as the storage device(s) 1015. Volatile media includes, without limitation, dynamic memory, such as the working memory 1025.

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 1010 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 1000. These signals, which might be in the form of electromagnetic signals, acoustic signals, optical signals and/or the like, are all examples of carrier waves on which instructions can be encoded, in accordance with various embodiments of the invention.

The communications subsystem 1020 (and/or components thereof) generally will receive the signals, and the bus 1005 then might carry the signals (and/or the data, instructions, etc. carried by the signals) to the processor(s) 1010, or working memory 1025, from which the processor(s) 1010 retrieves and executes the instructions. The instructions received by the working memory 1025 may optionally be stored on a storage device 1015 either before or after execution by the processor(s) 1010.

According to a set of embodiments, the computer system 1000 may be a searchable best fit abstraction engine in communication with a network, one or more network resources, network inventory server, customer end devices, and service provider end devices. In various embodiments, each of the one or more network resources, network inventory server, customer end devices, and service provider end devices may themselves include one or more elements of the computer system 1000.

According to various sets of embodiments, the computer system 1000 may include computer readable media, having stored thereon a plurality of instructions, which, when executed by the processor 1010, allows the computer system 1000 to retrieve, from the network inventory server, a network inventory of network resources. The computer system 1000 may instantiate, for at least one of the network resources, an inventory class object having a set of service abstractions. The computer system 1000 may define the set of service abstractions for the inventory class object to include at least one of properties, interfaces, capabilities, and requirements for network resources in the inventory class object. The computer system 100 may further provide a customer facing interface, accessible through communications subsystem 1020, allowing a customer to identify service offerings available to the customer satisfying an at least one service requirement, and a service provider facing interface, accessible via communications subsystem 1020, allowing a provider to define a service offering based on a service template. The computer system 1000 may then provision at least one service offering satisfying the service requirement or as defined by the service template.

In another set of embodiments, the computer system 1000 may include in the computer readable media further instructions to receive a search query indicating at least one service requirement through the communications subsystem 1020. The computer system 1000 may then map each of the at least one service requirement to a set of one or more requirement abstraction. The computer system may identify at least one inventory class object comprising a set of service abstractions satisfying the set of one or more requirement abstractions. One or more network resources belonging to the identified at least one inventory class object may further be identified. Based on the one or more network resources, the computer system 1000 may then determine at least one service offering utilizing the one or more network resources, satisfying the at least one service requirement, and available to the customer. The computer system 1000 may then receive, via communications subsystem 1020, a selection of at least one selected service offering from the customer, and provision the at least one selected service offering to a service location, as indicated by the customer.

In some further embodiments, the computer system 1000 may further be programmed to identify a service template comprising one or more interconnected inventory class objects, the one or more interconnected inventory class objects including the identified at least one inventory class object. The computer system 1000 may then identify one or more service offerings, including the at least one service offering, utilizing the service template. In another embodiment, the service template may further include a component sub-template defining a prerequisite service. The computer system 1000 may then further identify a prerequisite service offering indicated by the component sub-template, the prerequisite service offering being required to provision the at least one selected service offering. The computer system 1000 may therefore also provision the prerequisite service offering for any of the at least one selected service offering.

According to yet further sets of embodiments, computer system 1000 may receive, via the communications subsystem 1020, a service template comprising one or more interconnected inventory class objects, from a service provider, each of the one or more interconnected inventory class objects having a respective set of service abstractions. The computer system 1000 may then determine whether at least one network resource is available in the inventory of network resources satisfying the respective set of service abstractions for each of the one or more interconnected inventory class objects. The computer system 1000 may create at least one service offering utilizing one or more network resources of the identified at least one network resource determined to satisfy each respective set of service abstractions. In further embodiments, the computer system 1000 may identify at least one external network resource available from a second service provider different from the service provider and satisfying the respective set of service abstractions for at least one of the one or more interconnected inventory class objects. Thus, the computer system 1000 may include the at least one external network resource in the at least one service offering.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture, but instead can be implemented on any suitable hardware, firmware, and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added, and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A system for a searchable best fit abstraction framework comprising:
a network having one or more network resources;
a network inventory server programmed to generate a network inventory of the one or more network resources on the network;
a searchable best fit abstraction engine in communication with the network inventory server, the searchable best fit abstraction engine comprising:
at least one processor;
a non-transitory computer readable media having encoded thereon computer software comprising a set of instructions executable by the at least one processor to perform one or more operations, the set of instructions comprising:
instructions to retrieve, from the network inventory server, the network inventory of the one or more network resources;
instructions to define a set of service abstractions, wherein the set of service abstractions includes at least one of properties, interfaces, capabilities, and requirements;
instructions to provide a customer facing interface allowing a customer to identify service offerings available to the customer satisfying at least one service requirement;
instructions to provide a service provider facing interface allowing a provider to define a service offering based on a service template; and
instructions to provision at least one service offering satisfying the service requirement or defined by the service template.

2. The system of claim 1, wherein the searchable best fit abstraction engine further comprises in the set of instructions:
instructions to receive a search query indicating at least one service requirement;
instructions to map each of the at least one service requirement to a set of one or more requirement abstraction;
instructions to identify one or more inventory class objects, from a pool of inventory class objects, each of the one or more inventory class objects having a respective set of service abstractions satisfying the set of one or more requirement abstractions;
instructions to identify one or more matching network resources for each of the one or more inventory class objects and fitting each respective set of service abstractions;
instructions to identify based on the one or more matching network resources of the at least one inventory class object, at least one service offering utilizing the one or more matching network resources, satisfying the at least one service requirement; and
instructions to receive, via the customer facing interface, a selection of at least one selected service offering of the identified at least one service offering from the customer, wherein the at least one selected service offering is provisioned to a customer premises of the customer.

3. The system of claim 1, wherein the searchable best fit abstraction engine further comprises in the set of instructions:
instructions to identify a service template; and
instructions to identify one or more service offerings, including the at least one service offering, fitting the service template.

4. The system of claim 3, wherein the service template further comprises a component sub-template defining a prerequisite service, wherein the searchable best fit abstraction engine further comprises in the set of instructions:
instructions to identify a prerequisite service offering indicated by the component sub-template, the prerequisite service offering being required to provision the at least one selected service offering; and
instructions to provision the prerequisite service offering for any of the at least one selected service offering.

5. The system of claim 3, wherein at least one of the respective sets of service abstractions includes a requirement for a required inventory class object not included in the service template, wherein the searchable best fit abstraction engine further comprises in the set of instructions:
instructions to identify one or more required network resources corresponding to the required inventory class object, the one or more required network resources excluded from the identified one or more network resources; and
instructions to identify at least one required service offering utilizing the one or more required network resources.

6. The system of claim 1, wherein the searchable best fit abstraction engine further comprises in the set of instruction:
instructions to identify at least a first service template and a second service template; and
instructions to identify one or more service offerings for each of the first and second service templates, the one or more service offerings including the at least one service offering.

7. The system of claim 1, wherein the searchable best fit abstraction engine further comprises in the set of instructions:
instructions to receive a service template comprising one or more interconnected inventory class objects, from a service provider, each of the one or more interconnected inventory class objects having a respective set of service abstractions;
instructions to determine whether at least one network resource is available in the inventory of network resources satisfying the respective set of service abstractions for each of the one or more interconnected inventory class objects; and
instructions to create the at least one service offering utilizing one or more network resources of the inventory of network resources determined to satisfy each respective set of service abstractions.

8. The system of claim 7, wherein the searchable best fit abstraction engine further comprises in the set of instructions:
instructions to identify at least one external network resource available from a second service provider different from the service provider, satisfying the respective set of service abstractions for at least one of the one or more interconnected inventory class objects, wherein the at least one service offering utilizes the at least one external network resource.

9. The system of claim 1, wherein the one or more network resources include one or more host machines respectively hosting one or more virtualized machine instances, wherein the searchable best fit abstraction engine further comprises in the set of instructions:

instructions to instantiate an inventory class object for each of the one or more virtualized machine instances.

10. A searchable best fit abstraction engine comprising:
at least one processor;
a non-transitory computer readable media having encoded thereon computer software comprising a set of instructions executable by the at least one processor to perform one or more operations, the set of instructions comprising:
  instructions to retrieve, from a network inventory server, a network inventory of network resources;
  instructions to define a set of service abstractions, wherein the set of service abstractions includes at least one of properties, interfaces, capabilities, and requirements;
  instructions to provide a customer facing interface allowing a customer to identify service offerings available to the customer satisfying at least one service requirement;
  instructions to provide a service provider facing interface allowing a provider to define a service offering based on a service template; and
  instructions to provision at least one service offering satisfying the service requirement or defined by the service template.

11. The searchable best fit abstraction engine of claim 10, wherein the set of instructions further comprises:
  instructions to receive a search query indicating at least one service requirement;
  instructions to map each of the at least one service requirement to a set of one or more requirement abstraction;
  instructions to identify at least one inventory class object comprising a set of service abstractions satisfying the set of one or more requirement abstractions;
  instructions to identify one or more network resources belonging to the identified at least one inventory class object;
  instructions to identify based on the one or more network resources of the at least one inventory class object, at least one service offering utilizing the one or more network resources, satisfying the at least one service requirement, and available to the customer; and
  instructions to receive, via the customer facing interface, a selection of at least one selected service offering of the identified at least one service offering from the customer, wherein the at least one selected service offering is provisioned to a customer premises of the customer.

12. A method for searchable best fit abstraction comprising:
  retrieving, from a network inventory server, a network inventory of network resources;
  defining, via the searchable best fit abstraction engine, the set of service abstractions, wherein the set of service abstractions includes at least one of properties, interfaces, capabilities, and requirements;
  providing, via the searchable best fit abstraction engine, a customer facing interface allowing a customer to identify service offerings available to the customer satisfying at least one service requirement;
  providing, via the searchable best fit abstraction engine, a service provider facing interface allowing a provider to define a service offering based on a service template; and
  provisioning, via the searchable best fit abstraction engine, at least one service offering satisfying the service requirement or defined by the service template.

13. The method of claim 12, further comprising:
  receiving, via the customer facing interface, a search query indicating at least one service requirement;
  mapping, via the searchable best fit abstraction engine, each of the at least one service requirement to a set of one or more requirement abstraction;
  identifying, via the searchable best fit abstraction engine, at least one inventory class object comprising a set of service abstractions satisfying the set of one or more requirement abstractions;
  identifying, via the searchable best fit abstraction engine, one or more network resources belonging to the identified at least one inventory class object;
  identifying, via the searchable best fit abstraction engine, based on the one or more network resources of the at least one inventory class object, at least one service offering utilizing the one or more network resources, satisfying the at least one service requirement, and available to the customer; and
  receiving, via the searchable best fit abstraction engine, a selection of at least one selected service offering of the identified at least one service offering from the customer, wherein the at least one selected service offering is provisioned to a service location.

14. The method of claim 12, further comprising:
  identifying a service template; and
  identifying one or more service offerings, including the at least one service offering, fitting the service template.

15. The method of claim 14, wherein the service template further comprises a component sub-template defining a prerequisite service, the method further comprising:
  identifying a prerequisite service offering indicated by the component sub-template, the prerequisite service offering being required to provision the at least one selected service offering; and
  provisioning the prerequisite service offering for any of the at least one selected service offering.

16. The method of claim 14, wherein at least one of the respective sets of service abstractions includes a requirement for a required inventory class object not included in the service template, the method further comprising:
  identifying one or more required network resources corresponding to the required inventory class object, the one or more required network resources excluded from the identified one or more network resources; and
  identifying at least one required service offering utilizing the one or more required network resources.

17. The method of claim 12, further comprising:
  identifying at least a first service template and a second service template; and
  identifying one or more service offerings for each of the first and second service templates, the one or more service offerings including the at least one service offering.

18. The method of claim 12, further comprising:
  receiving a service template comprising one or more interconnected inventory class objects, from a service provider, each of the one or more interconnected inventory class objects having a respective set of service abstractions;
  determining whether at least one network resource is available in the inventory of network resources satisfying the respective set of service abstractions for each of the one or more interconnected inventory class objects; and creating the at least one service offering utilizing one or more network resources of the inventory of network resources determined to satisfy each respective set of service abstractions.

19. The method of claim 18, further comprising:

identifying at least one external network resource available from a second service provider different from the service provider, satisfying the respective set of service abstractions for at least one of the one or more interconnected inventory class objects, wherein the at least one service offering utilizes the at least one external network resource.

20. The method of claim 12, wherein the one or more network resources include one or more host machines respectively hosting one or more virtualized machine instance, wherein the searchable best fit abstraction engine further comprises in the set of instructions:

instantiating an inventory class object for each of the one or more virtualized machine instances.

\* \* \* \* \*